United States Patent [19]

Armstrong

[11] Patent Number: 4,895,320
[45] Date of Patent: Jan. 23, 1990

[54] ANTICIPATORY CONTROL SYSTEM FOR AN ANTI-G SUIT

[75] Inventor: Kenneth C. Armstrong, Hurst, Tex.
[73] Assignee: General Dynamics Corporation, Fort Worth, Tex.
[21] Appl. No.: 268,491
[22] Filed: Nov. 8, 1988
[51] Int. Cl.$^4$ ............................................. B64D 10/00
[52] U.S. Cl. ................................... 244/118.5; 244/121; 600/20; 2/2.1 A
[58] Field of Search ............... 244/118.5, 121, 122 R, 244/122 AG, 122 AB, 191, 194, 195, 178; 600/19, 20; 2/2.1 A, 6

[56] References Cited

U.S. PATENT DOCUMENTS

| | | |
|---|---|---|
| 3,089,482 | 5/1963 | Gray . |
| 3,780,723 | 12/1973 | Van Patten et al. . |
| 3,792,426 | 2/1974 | Ravenelle et al. . |
| 3,956,772 | 5/1976 | Cox . |
| 4,243,024 | 1/1981 | Crosbie et al. . |
| 4,302,745 | 11/1981 | Johnston et al. ................. 244/194 |
| 4,534,338 | 8/1985 | Crosbie et al. . |
| 4,638,791 | 1/1987 | Krogh et al. . |
| 4,736,731 | 4/1988 | Van Patten ........................ 600/20 |
| 4,787,576 | 11/1988 | McGrady et al. ............. 244/118.5 |

*Primary Examiner*—Galen Barefoot
*Attorney, Agent, or Firm*—James E. Bradley

[57] ABSTRACT

A control system for an anti-G suit for aircraft pilots anticipates G-forces before they are incurred. The system has an available load circuit which receives the actual airspeed signal and computes an available load factor. The system is connected to the command stick of the pilot. The signal from the command stick is multiplied by the available load factor to provide an anticipated G-force. A selector monitors the actual acceleration with the anticipated signal and passes the higher of the two to a valve. The valve controls air pressure leading to the anti-G suit.

3 Claims, 2 Drawing Sheets

ANTICIPATORY CONTROL SYSTEM FOR AN ANTI-G SUIT

BACKGROUND OF THE INVENTION

1. Field of the Invention:

This invention relates in general to systems for enhancing the capability of a pilot of a fighter type aircraft to withstand acceleration forces on his body.

2. Description of the Prior Art:

Pilots of high-performance jet fighter aircraft have always been prone to grayout or blackout, and to a lesser extent, loss of consciousness, due to the aircraft's high gravitational force (G-force) capability. Sharp high speed maneuvers can cause the gravitational forces to become very high in a short space of time. For example, a high performance fighter aircraft may be able to achieve 9-G's ( nine times the force of gravity) within three to four seconds time.

The only protection used in the past against this graying or blacking out is an anti-G suit and a straining maneuver performed by the pilot. The anti-G suit is a pair of trousers with a liner or bladder that can be inflated to more tightly squeeze the lower portion of the pilot's body from about the waist down. The suit will be connected to an air compressor through a valve. The inflated bladder helps keep blood from pooling in the lower extremities, which could result in grayout, blackout and loss of consciousness.

The valve is controlled by an accelerometer. The accelerometer is basically a weight and spring mechanism that will distend with increasing G-forces. The accelerometer is connected to the valve to inflate and deflate the suit accordingly. The anti-G suit inflates with increasing gravity forces to restrict the flow of blood to the pilot's lower extremities, so that oxygen carrying blood is available in the brain.

The response time in the suit is dependent on valve friction, the anti-G suit hose length, valve resistance, volume of the suit bladder, and the correctness of the fit of the suit. This response time causes a delay, typically about one-half to one second, between the pressure required and the actual pressure delivered.

This delay in pressure was not dangerously critical until the advent of aircraft capable of rapid-G onset and sustained high-G maneuvering. These characteristics cause the pilot to approach the G-induced loss of consciousness region without having the benefit of passing through the grayout region. The grayout region typically warns the pilot of the possibility of loss of consciousness or blackout. A properly fitted anti-G suit will raise the G-time tolerance for an increased protection of approximately one G. More importantly, it forces the pilot to begin his straining maneuver, which further increases his G-tolerance another three to four G's. The combination of these two functions allow the pilot to tolerate up to nine G's.

A rapid-G onset aircraft creates a need to shorten the anti-G suit inflation time delay and furnish the pilot pressure on his lower extremities so that he can better resist the G-load applied to his body. Some pilots have occasionally reached down and pre-inflated the anti-G suit with a test button prior to pulling G's if the time and conditions permitted. This action allows the pressure required in the suit to more closely match the pressure needed.

SUMMARY OF THE INVENTION

The control system of this invention uses the aircraft flight control system to anticipate the response of the aircraft. The anti-G system is connected electrically to the control stick. An available load factor of the aircraft is computed based on the airspeed sensed and the type of aircraft. This factor is combined with the signal from the control stick to provide an electrical signal that indicates the anticipated G-forces that the aircraft will be shortly undergoing.

An accelerometer senses the actual G's of the aircraft. The actual G-forces are compared with the anticipated G-forces by a selector. The larger of the two proceeds to the valve to control the air pressure to the anti-G suit. This signal starts the valve opening sooner, and the anti-G suit starts to inflate before the aircraft responds. As the aircraft responds to the flight control inputs, the anti-G suit will pressurize to the correct pressure and will remain correctly pressurized as the G-force is increased r decreased. This serves to keep the blood from pooling and also warns the pilot of the ensuing G's so that he can be better prepared to counteract them.

DESCRIPTION OF THE PREFERRED EMBODIMENT

Figure 1:
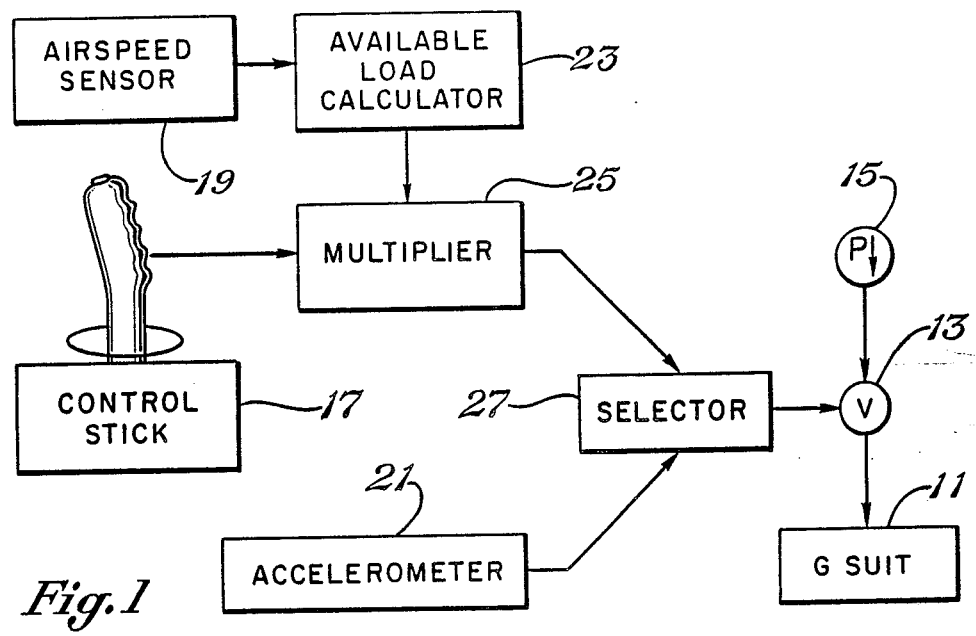
FIG. 1 is a block diagram illustrating an anti-G control system constructed in accordance with this invention.

Referring to FIG. 1, the system will employ a conventional anti-G suit 11, also referred to as a G-suit. The anti-G suit 11 is of a conventional type that has a bladder that will inflate to apply pressure to the legs and abdomen of the pilot. The anti-G suit 11 is connected to a conventional electronic valve 13, which operates with an electrical signal to supply pressure from a compressed air system 15.

Valve 13 can also bleed off pressure. Valve 13 has incorporated within it circuitry which maintains a level of air pressure in the anti-G suit 11 in proportion to the level of the electrical signal received by its circuitry. A higher magnitude signal will result in the valve 13 maintaining a higher pressure in the anti-G suit 11 than a lower magnitude signal. Electronic valves 13 of this nature including their circuitry are commercially available.

The aircraft will have a control stick 17. The control stick 17 is part of an aircraft control system which controls the primary flight control surfaces of the aircraft to cause descent, ascent and turns. Control stick 17 is conventional and provides an electrical signal output to various mechanisms for controlling the aircraft. The anticipatory control system of this invention is connected to the control stick 17 so as to monitor the signal when the control stick 17 is pulled back to begin a positive G maneuver.

The aircraft will also have a conventional airspeed sensor 19. In addition, the aircraft will have an accelerometer 21 of a conventional type which will provide an electrical signal proportional to the actual normal acceleration or G-forces that the aircraft is undergoing. The normal acceleration is acceleration in directions perpendicular to the longitudinal axis of the aircraft.

The control system for the anti-G suit 11 includes an available load factor calculator 23. The available load factor is a fractional number between zero and one that is calculated for a particular aircraft design and weight and the airspeed. The available load factor changes with aircraft speed. A graph of the available load factor versus speed may be drawn and electrically approximated for any given aircraft. In this invention, preferably the graph or curve is approximated as a straight line, the slope of which depends on the particular aircraft and weight. For example, an aircraft might have an available load factor curve that is zero up to about 80 knots and reaches one at about 400 knots.

This graph enables a pilot or designer to compute the maximum G-forces an aircraft is able to undergo at any given speed. Each aircraft has a known maximum G-force which the aircraft is capable of reaching at high speeds, where the available load factor is one. Determining the expected maximum G-force at lower speeds is done by multiplying the available load factor at a particular speed times the known maximum G-force which that aircraft can achieve at high speeds. In the above example, the available load factor at 200 knots would be about 0.5. If the aircraft is able to achieve 9-G acceleration above 400 knots, then at 200 knots, it would be capable of achieving only about 4.5 G's. Computing an available load factor versus speed is a known technique.

The output signal from the available load calculator 23 is a voltage which represents the available load factor of the aircraft at the speed sensed by the airspeed sensor 19. This signal is applied to a conventional multiplier 25. The multiplier 25 also receives the electrical signal from the control stick 11 which represents pulling back on the control stick 11 to begin a positive G maneuver, such as a tight turn at a speed above 400 knots. The multiplier 25 will not receive any other signals from the control stick 11, such as commands for rolls.

The multiplier 25 will multiply the available load factor signal from the available load calculator 23 times the electrical signal from the pilot's command of the control stick 17. The product from the multiplier is proportional t the anticipated G-forces that the plane will be expected to undergo. For example, if the available load factor is .8, if the aircraft is capable of 9 G's, and if the control stick 17 is pulled back all the way, then the anticipated G-force will be 7.2. A signal (voltage) proportional to 7.2 G's will be output from the multiplier 25.

This product is provided to a selector 27. Selector 27 receives the output also from the accelerometer 21. Selector 27 is a conventional element which will select the higher value signal, and allow that signal to pass to the control valve 13.

Figure 2:
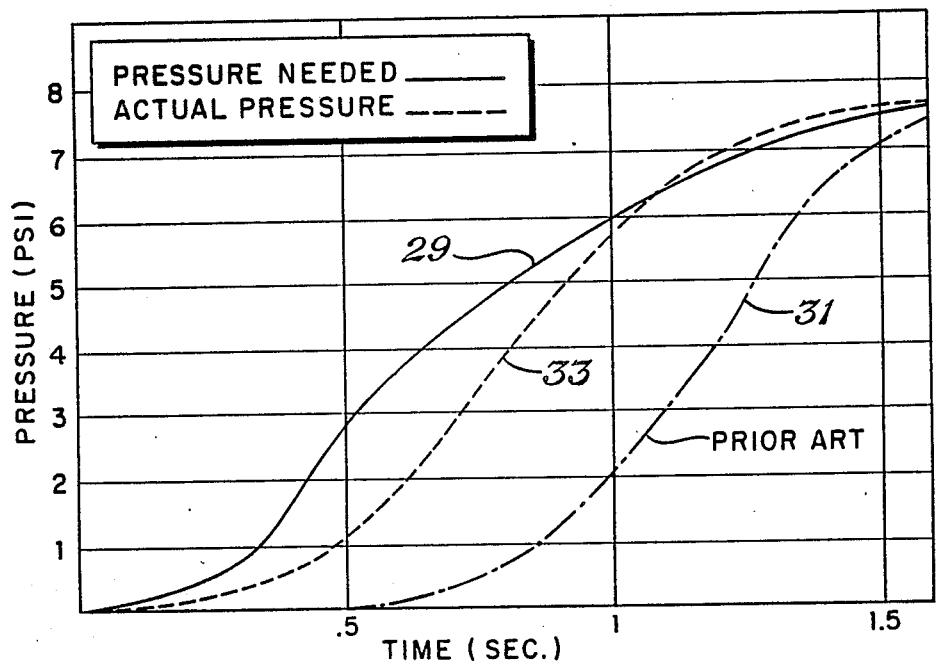
FIG. 2 is a graph illustrating the time required for a pressure suit to inflate utilizing this invention in comparison with actual pressure desired and in comparison with the prior art system.

Referring to FIG. 2, the curve 29 is proportional to actual G-force versus time for a particular aircraft undergoing a high-G onset. Curve 29 thus represents the actual pressure needed in an anti-G suit 11 when undergoing a high G-force maneuver. The curve 31 represents the pressure versus time for a prior art system. Up to about one and one half seconds, the prior art system is not supplying sufficient pressure because of the delay in the response time of the compressed air system 15, valve 13 and anti-G suit 11 interconnecting hoses.

The curve 33 represents the system of this invention. Because the G-forces have been anticipated, the valve 13 opens to start inflating the anti-G suit 11 before the G-forces are actually encountered. Because of the inherent delay in the inflation of the anti-G suit 11, the pressure as indicated by curve 33 does not occur before actual pressure is needed. However, it is much closer to the actual pressure needed. The delay is much less than the difference between the curves 29 and 31.

Figure 3:
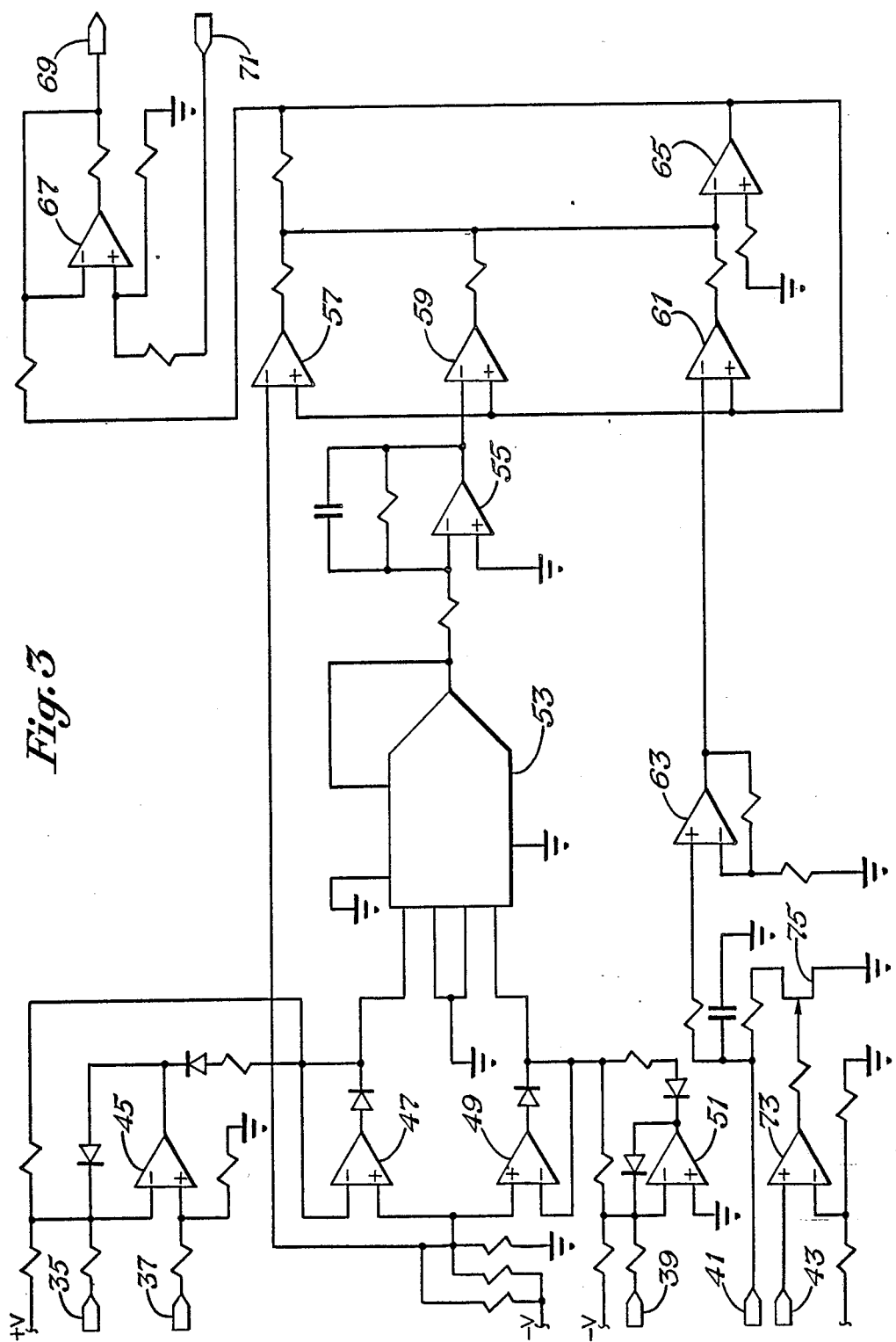
FIG. 3, is an electrical schematic illustrating the anti-G suit control system of this invention.

More detailed circuitry is illustrated in FIG. 3. Inputs 35, 37 are the high and low inputs from the control stick 17 (FIG. 1). Input 39 is the input from the airspeed sensor 19 (FIG. 1). Input 41 is the input from the accelerometer 21 (FIG. 1). Input 43 is an input from the weight sensed on the wheels. The weight will be sensed only when the aircraft is on the ground.

The control stick inputs 35, 37 are connected to an operational amplifier 45, which contains conventional scaling and other associated circuitry. Operational amplifiers 47, 49 and 51 are connected together with various resistors in a conventional manner to provide the curve for the available load factor versus speed for the available load calculator 23 (FIG. 1). The output from the amplifier 45, which represents the commanded G-force from control stick 17 (FIG. 1), is connected to the input of a multiplier 53. The outputs from operational amplifier 47, 49 and 51 are connected to inputs of the multiplier 53.

The product or output from the multiplier 53 represents the anticipated G-forces on the airplane. This is applied to a conventional operational amplifier 55 and to an amplifier 59. Amplifier 59 is part of selector 27 (FIG. 1), which is shown in the schematic to be a middle value selector, but operated as a high value selector. The selector 27 (FIG. 1) includes amplifiers 57, 59 and 61.

The actual measured acceleration at input 41 is supplied through an amplifier 63 to the amplifier 61. The amplifiers 57, 59 and 61 will pass to amplifier 65 the middle value signal. The middle value signal will be the higher of the anticipated signal from amplifier 55 or the actual acceleration from amplifier 63. Normally, after a few seconds, the actual signal from the accelerometer 21 (FIG. 1) will be equal or higher, but in the first few seconds, the anticipated signal will be the higher. This signal is fed to an amplifier 67, which leads to an output 69. The output 69 is applied to the circuitry of control valve 13 (FIG. 1). Input 71 is an electrical ground input.

The system can be tested. The weight on wheels input 43 is applied to an amplifier 73 and to a transistor 75. The scaling is such that if weight is sensed by the wheels, only a signal representing about three G's can be applied through the circuitry to the valve 13 (FIG. 1). This prevents the anti-G suit from inflating during a ground test to the full nine G's capacity, which on the ground could cause discomfort to the pilot. The actual values of the various resistors and other elements illustrated in FIG. 3 will depend upon the particular aircraft.

The invention has significant advantages. The system anticipates the G-forces before they occur, therefore, can begin applying pressure to the anti-G suit before the G-forces occur. The response time for the suit to inflate more closely matches the actual G-forces as they are incurred. The multiplication by an available load factor assures that the anti-G suit is not overinflated at lower airspeed conditions where there is insufficient energy for the aircraft to obtain the G-level command by the pilot. The selector which applies the higher value of the anticipated command or the actual load will allow the anti-G suit to remain at the correct pressure regardless of the pilot's command input to the control stick.

While the invention has been shown in only one of its forms, it should be apparent to those skilled in the art that it is not so limited, but is susceptible to various changes without departing from the scope of the invention. For instance, the anticipatory control signal could be computed in software rather than the analog circuitry described.

I claim:

1. In an aircraft having a controller controlled by a pilot which provides a command for controlling pitch of the aircraft, an airspeed sensor which provides an airspeed value corresponding to airspeed, an accelerometer for providing an acceleration value as an indication of normal acceleration of the aircraft, and an inflation system having a compressed air system which supplies fluid pressure through a valve to an anti-G suit, a control means for controlling the pressure in the anti-G suit, comprising in combination:

available load means for computing an available load factor based on airspeed and weight of the aircraft;

means for monitoring the controller to detect a positive command signal when the pilot pulls on the control stick to begin a positive G-force maneuver;

modifying means for modifying the positive command signal by the available load factor to provide an anticipatory value corresponding to an estimated expected G-force based solely on the positive command signal and the available load factor, and for providing the anticipatory value substantially simultaneously with the giving of the positive command signal; and selector means for providing to the valve a signal representing the higher of the anticipatory value and acceleration value to control the valve to begin inflating the anti-G suit prior to actually undergoing the expected G-force if the anticipatory value is higher than the acceleration value and to maintain the anti-G suit at a correct pressure as the actual G-force increases and decreases.

2. In an aircraft having a controller which provides a command signal for controlling pitch of the aircraft, an airspeed sensor which provides an airspeed signal corresponding to airspeed, an accelerometer for providing an acceleration signal as an indication of normal acceleration of the aircraft, and an inflation system having a compressed air system which supplies fluid pressure through a valve to an anti-G suit, a control means for controlling the pressure in the anti-G suit, comprising in combination:

available load means receiving the airspeed signal, for computing an available load factor based on airspeed and weight of the aircraft, and for providing an electrical available load signal corresponding thereto;

means for monitoring the controller to detect a positive command signal when the pilot pulls on the control stick to begin a positive G-force maneuver;

modifying means receiving the available load signal and the positive command signal from the controller, for multiplying the positive command signal with the available load signal to provide an anticipatory signal corresponding to an estimated expected gravity force based on solely on the command signal and the available load signal, and for providing the anticipatory signal substantially simultaneously with the giving of the command; and selector means receiving the anticipatory signal and the acceleration signal, and for providing to the valve the higher of the anticipatory signal and acceleration signal to control the valve to begin inflating the anti-G suit prior to actually undergoing the expected G-force if the anticipatory value is higher than the acceleration value and to maintain the anti-G suit at a correct pressure as the actual G-force increases and decreases.

3. A method for controlling an anti-G suit inflation system in an aircraft having a controller which provides a command for controlling pitch of the aircraft, an airspeed sensor which provides an airspeed value corresponding to airspeed, and an accelerometer for providing an acceleration value as an indication of normal acceleration of the aircraft, the inflation system being of the type having a compressed air system which supplies fluid pressure through a valve to an anti-G suit, the method comprising in combination:

computing in response to the airspeed value an available load factor based on airspeed and weight of the aircraft;

detecting a positive command signal from the controller when the pilot pulls on the control stick to begin a positive G-force maneuver;

multiplying the positive command signal from the controller with the available load factor and providing an anticipatory value corresponding to an estimated expected gravity force based solely on the positive command signal and the available load factor, and providing the anticipatory value substantially simultaneously with the giving of the positive command signal; and providing to the valve a signal representing the greater of the anticipatory signal and the acceleration signal, to control the valve to begin inflating the anti-G suit prior to actually undergoing the expected G-force if the anticipatory value is higher than the acceleration value and to maintain the anti-G suit at a correct pressure as the actual G-force increases and decreases.

* * * * *